Figure 2:
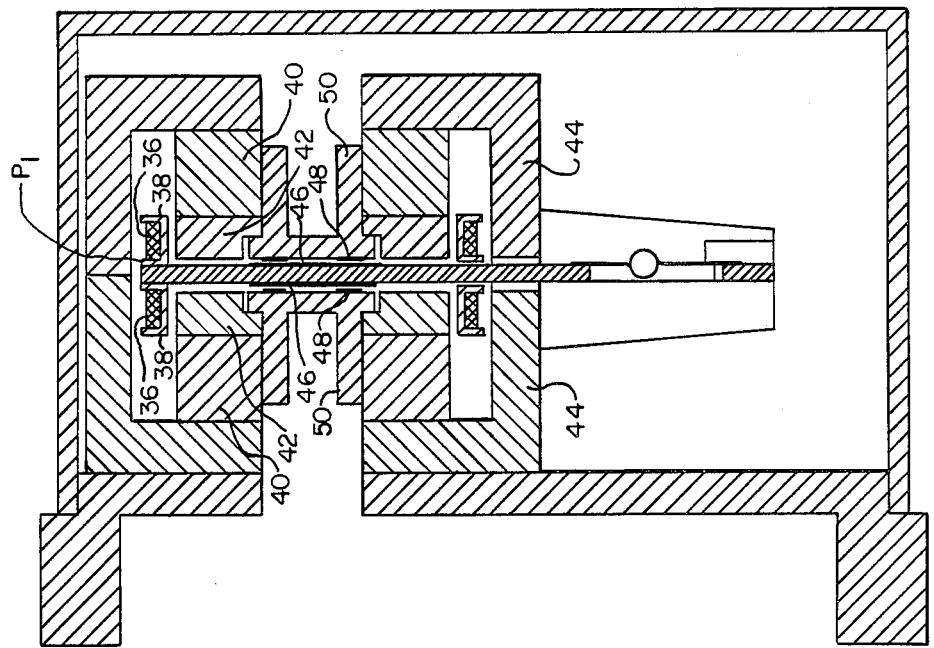

United States Patent [19]

Woodruff

[11] Patent Number: 4,779,463
[45] Date of Patent: Oct. 25, 1988

[54] SERVO ACCELEROMETER

[75] Inventor: James R. Woodruff, Concord, Calif.

[73] Assignee: Systron Donner Corporation, Concord, Calif.

[21] Appl. No.: 3,483

[22] Filed: Jan. 13, 1987

[51] Int. Cl.[4] .................. G01P 15/08; G01P 15/13
[52] U.S. Cl. .................... 73/517 R; 73/517 B
[58] Field of Search ............. 73/517 R, 517 B, 514

[56] References Cited

U.S. PATENT DOCUMENTS

| | | | |
|---|---|---|---|
| 3,603,159 | 9/1971 | Morrow | 73/517 |
| 3,702,073 | 11/1972 | Jacobs | 73/517 R |
| 3,772,920 | 11/1973 | Burgwin | 73/517 B |
| 4,071,838 | 1/1978 | Block | 338/47 |
| 4,104,920 | 8/1978 | Albert et al. | 73/517 AV |
| 4,131,020 | 12/1978 | Hugli et al. | 73/517 B |
| 4,182,187 | 1/1980 | Hanson | 73/497 |
| 4,250,757 | 2/1981 | Hanson | 73/517 B |
| 4,394,405 | 7/1983 | Atherton | 427/58 |
| 4,399,700 | 8/1983 | Hanson | 73/517 B |
| 4,400,979 | 8/1983 | Hanson et al. | 73/517 B |
| 4,441,366 | 4/1984 | Hanson | 73/517 B |
| 4,488,445 | 12/1984 | Aske | 73/517 R |
| 4,598,585 | 7/1986 | Boxenhorn | 73/505 |
| 4,649,748 | 3/1987 | Fukano et al. | 73/517 B |
| 4,679,434 | 7/1987 | Stewart | 73/517 B |

FOREIGN PATENT DOCUMENTS 2424529 4/1979 France .
534694 4/1975 U.S.S.R. .

Primary Examiner—Tom Noland
Assistant Examiner—Robert P. Bell
Attorney, Agent, or Firm—Flehr, Hohbach, Test, Albritton & Herbert

[57] ABSTRACT

A servo type accelerometer including a main support base, a pendulum assembly and a servo arrangement is disclosed herein. The pendulum assembly includes a pendulum and means supporting the pendulum for limited rotational movement through a normal resting plane about a fixed axis within that plane and relative to the base in response to and as a result of the pendulum being subjected to acceleration forces normal to the resting plane. The servo arrangement cooperates with the pendulum for monitoring the presence and magnitude of these acceleration forces, if present. A particular feature of the accelerometer disclosed resides in specifically designed flexures for supporting the pendulum and a technique for preventing these flexures from being placed in a state of compression and possibly being damaged thereby. Another feature resides in the way in which the entire pendulum assembly is supported to the base and still another feature resides in the particular way in which the torque coil forming part of the servo arrangement is mounted to the pendulum.

17 Claims, 1 Drawing Sheet

U.S. Patent

Oct. 25, 1988

4,779,463

SERVO ACCELEROMETER

The present invention relates generally to accelerometers and more particularly to a number of different improvements in a pendulous type of servo accelerometer with a flexure suspension.

The typical pendulous type of servo accelerometer comprises a main support base, a pendulum assembly and a servo arrangement. The pendulum assembly may be divided into three parts, a pendulum, a support member for the pendulum which itself is supported by the main support base, and means for attaching the pendulum to its support member in a way which permits limited rotation through a normal resting plane about a fixed axis within that plane and relative to the support base. This movement is in response to and as a result of the pendulum being subjected to acceleration forces normal to the resting plane. The servo arrangement cooperates with the pendulum for monitoring the presence and magnitude of these acceleration forces, if present.

More specifically, as the pendulum tends to move away from its resting position in response to the acceleration forces being monitored, a torque coil, which forms part of the servo arrangement and is mounted to and is part of the pendulum, and which is immersed in a magnetic field, is energized with an electric current sufficient to prevent the pendulum from moving from its normal resting plane. The amount of current necessary to do this proportionate to the acceleration forces being monitored and therefore by monitoring these currents the acceleration forces themselves can be monitored.

In the typical flexure-suspended pendulous type of servo accelerometer described above, its pendulum is attached to the support member, in a manner which permits limited rotational movement, by means of a pair of spaced-apart, flat flexures which lie within the normal resting plane when the pendulum is at rest and which are sufficiently resilient to permit limited rotational movement of the pendulum. While these flexures are perfectly satisfactory for their intended purpose so long as the only acceleration forces applied to the pendulum are those normal to the resting plane, that is, the acceleration forces being monitored, other acceleration forces, for example, those directed along the axis of the pendulum normal to its pivot axis can place the flexures in a state of compression. Unless this is prevented, the flexures could buckle, crumble or otherwise break as a result of these compression loads.

It is an object of the present invention to provide an uncomplicated and yet reliable way of preventing the support flexures of the type recited immediately above from being placed in a state of compression when their associated pendulum is subjected to non-monitored acceleration forces that would otherwise place the flexures in a state of compression. As will be described in more detail hereinafter, in a preferred embodiment this is accomplished by providing a secondary flexure associated with each primary support flexure. Each secondary flexure is designed to be placed in a state of tension when the pendulum is subjected to these undesirable non-monitored acceleration forces so as to prevent its associated primary support flexure from being placed in a state of compression. In a most preferred embodiment, the overall accelerometer utilizes two spaced-apart primary support flexures and a secondary flexure associated with and located in close proximity to each primary flexure.

In a preferred method of making the pendulum assembly forming part of the accelerometer of the present invention and some prior art pendulum assemblies, the pendulum arm itself (the moving member which supports the torque coil), its support member (the stationary element) and the interconnecting flexures are preferably formed as an integral unit from a wafer of fused silica. Differences in the thermal expansion of the flexure and the material making up the base of the accelerometer tends to distort the stationary support member forming part of the overall pendulum assembly and degrade the performance of the accelerometer. One approach which has been suggested in the prior art to minimize this effect is to attach the stationary element of the pendulum assembly to a metal part made from a special alloy having, as nearly as possible, the same low coefficient of expansion as the pendulum assembly itself. However, the temperature coefficients of the materials are not exactly the same, and there is still performance degradation from differential thermal expansion.

Another object of the present invention is to provide an uncomplicated and yet reliable way to overcome the problems of the differential thermal expansion recited immediately above. As will be seen hereinafter, in the preferred embodiment of the present invention, this is accomplished by mounting the stationary support member forming part of the overall pendulum assembly to the main support base by means of a pair of spaced-apart flat leaf springs, each of which is connected at one end to the support member and at its opposite end to the main base with both leaf springs being disposed within planes normal to the resting plane of the pendulum and normal to the axis of movement of the pendulum. In a most preferred embodiment, as will also be seen, one of these two leaf springs bends oppositely at each end for reasons to be described and the other leaf spring is designed to have a shorter bending element than the first leaf spring, again for reasons to be discussed.

Still referring to the typical pendulous type of servo accelerometer in the prior art, another problem associated with this type of accelerometer results from the fact that the previously recited torque coil is supported by its associated pendulum arm. As a result, temperature changes induce stresses into the pendulum as a result of differences in thermal expansion between the two.

It is the further object of the present invention to minimize the problem just described by mounting the torque coil to the pendulum arm at discrete, spacedapart points to permit flexing of the torque coil to relieve thermal stresses. In a preferred embodiment, there are three such points which are equally spaced apart about the periphery of a section of the torque coil or torque coils.

Figure 1:
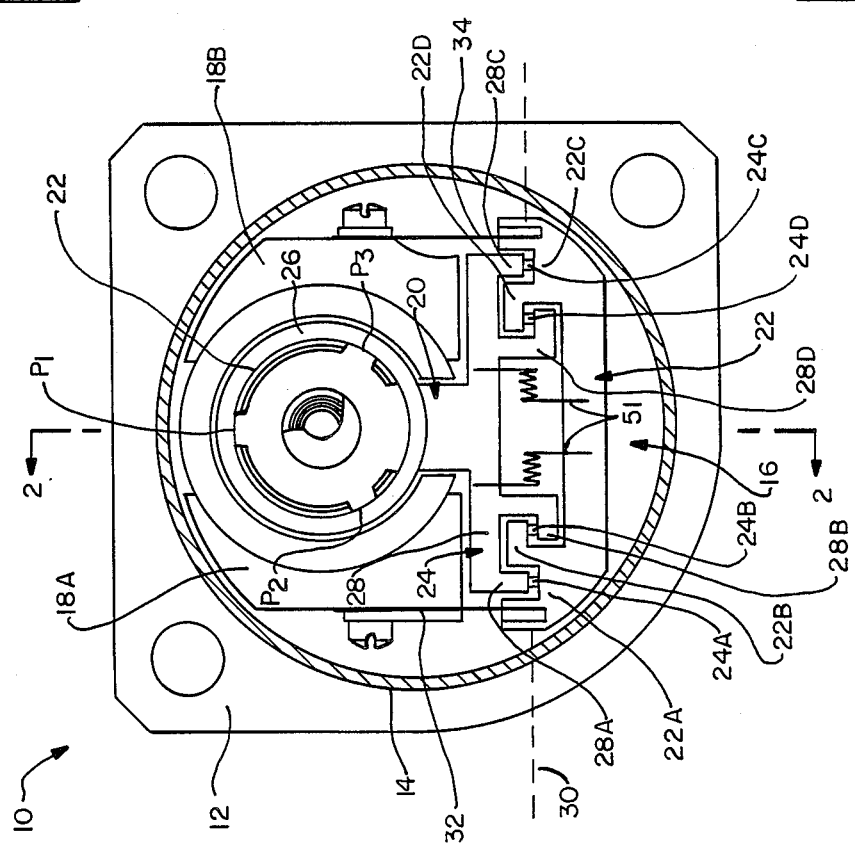

The present invention will be described in more detail hereinafter in conjunction with the drawings wherein:

FIG. 1 is a diagrammatic illustration, in plan view, of a pendulous type of servo accelerometer designed in accordance with a number of different features of the present invention; and FIG. 2 is a sectional view of the accelerometer illustrated in FIG. 1, taken generally along line 2—2 in FIG. 1.

Turning now to the drawing, part of an overall pendulous type of servo accelerometer designed in accordance with the present invention is generally indicated by the reference numeral 10 in FIG. 1. This accelerometer is shown including a main support base 12 constructed of, for example steel, and a housing which is generally indicated at 14 and which extends up from base 12. A pendulum assembly 16, designed in accordance with the present invention as will be seen hereinafter, is supported within housing 14 above main support base 12 by a pair of spaced-apart support members 18A and 18B connected directly to and extending up from base 12. These support members are typically constructed of the same material as base 12 and, in fact, may be formed as an integral unit with the base. As will be seen hereinafter, overall accelerometer 10 also includes a servo arrangement which cooperates with pendulum assembly 16 for monitoring the presence and magnitude of certain acceleration forces, if present, applied to the accelerometer in a particular direction.

Pendulum assembly 16 may be divided into three parts, (1) a flat, thin pendulum 20, (2) a flat, thin pendulum support 22 and (3) four flexures 24A, 24B, 24C and 24D, which interconnect the pendulum and pendulum support in the manner to be described below. In an actual working embodiment, these three parts are integrally formed from a thin wafer of fused silica. The flexures 24 are made thinner than the pendulum and pendulum support by means of chemical etching or other suitable means so that they support the pendulum for limited rotational movement relative to the pendulum support in the manner to be explained immediately below.

Pendulum 20 is itself comprised of a forwardmost arm and torque coil end 26 and a support end 28 which is comprised of four distinct legs 28A, 28B, 28C and 28D. The pendulum support 22 includes an arrangement of legs 22B and 22D adjacent to legs 28B and 28D and sections 22A and 22C adjacent to legs 28A and 28C.

As can be seen from FIGS. 1 and 2, the entire pendulum assembly 16, that is, pendulum 20, pendulum support 22, and the four flexures 24, lie within a common resting plane. The four flexures are located across a common fixed axis generally indicated by dotted lines at 30 in FIG. 1 and hold pendulum arm 20 to pendulum support 22 while also permitting limited rotational movement of the pendulum through its normal resting plane about axis 30. As will be seen below, the pendulum support is fixedly maintained in its resting plane above base 12 by leaf springs 32 and 34 which connect the pendulum support directly to support members 18A and 18B as discussed in detail hereinafter.

As indicated above, overall accelerometer 10 includes a servo arrangement which cooperates with pendulum assembly 16 to monitor the presence and magnitude of certain acceleration forces applied to the accelerometer. The specific acceleration forces to be monitored are those that act on end section 26 of the pendulum normal to its resting plane. The servo arrangement includes side-by-side torque coils 36 (see FIG. 2) wound within associated support bobbins 38 mounted to the end section 26 of pendulum 20 in a manner to be described hereinafter. The torque coils are immersed within a magnetic field provided by magnets 40 having pole pieces 42 supported within magnet housings 44, as best illustrated in FIG. 2. As is also best seen in this Figure, metal targets 46 are carried by and on opposite sides of pendulum section 26 while positioning sensing coils 48 are disposed in confronting relationship with the metal targets, as shown. These sensors which are supported by suitable means 50, the metal targets, the means defining the magnetic field itself, and the torque coils along with an electronic circuitry including flexible current lead wires 51 form the servo arrangement.

It is to be understood that, with certain exceptions to be noted, accelerometer 10 as described thus far including the pendulum assembly and servo arrangement is well-known in the art and thus has not been described in detail. As discussed above, the pendulum is supported for limited rotational movement through its resting plane in response to acceleration. When the pendulum is subjected to acceleration forces normal to this plane, it tries to move from its resting plane. At the same time, the torque coils are energized with a sufficient amount of current from a suitable source through leads 51 which in combination with the magnetic field, the metal targets 46 and sensors 48 maintains the pendulum in its resting plane precisely positioned between the two sensors. The amount of current required to accomplish this is proportionate to the acceleration forces applied to the pendulum and therefore by monitoring these currents the acceleration forces can be monitored. This technique by itself is not new and, hence, will not be described in further detail. It is only important to emphasize here that the acceleration forces being monitored are those forces or force components applied to pendulum 20 in a direction normal to its resting plane.

As indicated above, with certain exceptions, overall pendulum accelerometer 10 is well-known in the art. One exception resides in the particular arrangement of flexures 24. Heretofore, a typical pendulum corresponding to pendulum 20 has been supported to its pendulum support corresponding to support 22 by means of two flexures only, specifically flexures 24A and 24C. As a result, the overall accelerometer could be subjected to acceleration forces that would place these flexures in a state of compression as described above, thereby causing the flexures to crumble, break or otherwise fail. In accordance with one feature of the present invention, the additional flexures 24B and 24D are arranged in the manner illustrated in FIG. 1 so as to be placed in a state of tension by acceleration forces that would otherwise place the flexures 24A and 24C in a state of compression. In that way, the flexures 24B and 24D prevent the flexures 24A and 24C from actually being placed in compression.

A second difference between accelerometer 10 and those known in the art resides in the particular way in which pendulum support 22 is maintained in its stationary position. As indicated above, the pendulum support is connected to members 18 by means of leaf springs 32 and 34. As indicated above, certain pendulum assembly parts which include the support, the flexures, and the pendulum arm, are preferably manufactured as a single unit from a wafer of fused silica. This material is to be contrasted with the material making up base 12, which has a different coefficient of thermal expansion. Differences in the thermal expansion of the flexure material and the base material tend to distort the stationary part of the pendulum assembly, specifically pendulum support 22 and degrade the performance of the accelerometer. As indicated above, one method suggested heretofore to minimize this effect was to attach the stationary part of the pendulum assembly to a metal part made of a special alloy having, as nearly as possible, the same low coefficient of expansion as the flexures. However, the temperature coefficients of the materials are not exactly the same and there is still performance degradation from differential thermal expansion. In accordance with another aspect of the present invention, leaf springs 32 and 34 are used to support the stationary part of the pendulum assembly, that is, pendulum support 22, to support members 18 in a manner to be described immediately below.

As illustrated best in FIG. 1, the two flat leaf springs 32 and 34 extend within planes normal to the resting plane of pendulum assembly 16 and also normal to axis 30. This permits expansion of the pendulum assembly (e.g., the fused silica) relative to the accelerometer base 12 and supports 18A and 18B. Moreover, one of these springs, specifically spring 34 bends oppositely at each end to permit linear movement perpendicular to the plane of the leaf spring.

Relative thermal expansion of the pendulum material and the material of the base causes one end of flexure 34 to move relative to the other end, in a direction perpendicular to the original plane of the flexure. The end sections of this flexure are constrained from rotation by their attachment to other members, so the end sections are then in parallel, but displaced, planes. Near one end, the center section of the flexure bends toward the plane of the other end; near this other end the center section bends back to join that end in its plane which is parallel to, but displaced from, the plane of the first end, so the center section bends oppositely near its opposite ends. The other leaf spring, specifically leaf spring 32, has a shorter bending element to accommodate slight alignment changes and also provides sufficient stiffness to linear motion parallel to the hinge axis to prevent low frequency vibration of the mass supported by these leaf springs.

Still another difference between accelerometer 10 and those known in the prior art resides in the way in which torque coils 36 and their respective bobbins 38 are mounted to pendulum 20. Specifically, the torque coil and bobbins are connected to the pendulum at three points only which points are equally circumferentially spaced about the annular section 26. These points are generally indicated at points $P_1$, $P_2$ and $P_3$ in FIG. 1. The bobbins are mounted to the pendulum by suitable and readily providable bonding means. The $P_1$ point of connection is illustrated in FIG. 2. Note from this latter figure that the bottom end of each bobbin (its six o'clock position in FIG. 1) is not connected to the pendulum. Connecting the torque coils and their bobbins to the pendulum in this manner permits flexing of the torque coil to accommodate thermal expansion differences between the torque and the fused silica pendulum part.

What is claimed is:

1. An accelerometer comprising: a main support base, a pendulum assembly including a pendulum and means supporting said pendulum adjacent one and only one end thereof for limited rotational movement in either direction through a normal resting plane about a fixed axis relative to said base in response to and as a result of the pendulum being subjected to acceleration forces normal to said plane; and a servo arrangement cooperating with said pendulum for monitoring the presence and magnitude of said acceleration forces, if present; said means for supporting said pendulum for limited oscillatory movement including at least one flat primary flexure which has an end connected with said pendulum adjacent said one end of said pendulum, which lies within said normal resting plane and through said fixed axis when the pendulum is at rest and which bends back and forth such that its end connected with the pendulum moves back and forth through said resting plane to permit the pendulum said limited rotational movement, said supporting means also including means for preventing said primary flexure or flexures from being placed in a state of compression when said pendulum is subjected to acceleration forces that would otherwise place said flexure or flexures in a state of compression.

2. An accelerometer according to claim 1 wherein said means for preventing said primary flexure or flexures from being placed in a state of compression include at least one flat secondary flexure which is connected with said pendulum, which is sufficiently resilient to permit the pendulum said limited rotational movement, and which is positioned relative to said primary flexure or flexures to prevent the latter from being placed in a state of compression when said pendulum is subject to acceleration forces that would otherwise do so.

3. An accelerometer according to claim 2 wherein said secondary flexure or flexures are positioned relative to said primary flexure or flexures and said pendulum in a way which places said secondary flexure in a state of tension when said pendulum is subjected to acceleration forces that would otherwise put the primary flexure or flexures in compression.

4. An accelerometer according to claim 3 wherein said means for supporting said pendulum includes two primary flexures and a secondary flexure associated with each primary flexure.

5. An accelerometer according to claim 4 wherein each flat secondary flexure lies within said resting plane when the pendulum is at rest in close proximity to its associated primary flexure.

6. An accelerometer according to claim 5 wherein said means for supporting said pendulum includes a stationary support member separate from said base and means for connecting said support member to said base such that the support member remains substantially stationary relative to said base, and wherein said primary and secondary flexures extend between and are connected with said pendulum and said stationary support member across the axis of rotation of said pendulum, whereby to define said axis.

7. An accelerometer according to claim 6 wherein said pendulum has a free end opposite its axis of movement and wherein the pendulum and stationary support member are configured such that the end of each primary flexure closest to said free end is connected directly to said pendulum and the end of each of said secondary flexure closest to said free end is connected directly to said support member.

8. An accelerometer according to claim 6 wherein said means for connecting said support member to said base includes a pair of spaced-apart flat leaf springs such that one end of each leaf spring is connected with said base and its opposite end is connected with said support member, each of said leaf springs being disposed in a plane normal to said resting plane and normal to said fixed axis.

9. An accelerometer according to claim 8 wherein one of said leaf springs is configured to isolate the support member from differences in thermal expansion between the support member and base while the other of said leaf springs is sufficiently stiff to prevent low frequency vibrations parallel to said axis from occurring in said support member.

10. An accelerometer according to claim 6 wherein said servo arrangement includes a torque coil or torque coils and means for supporting said torque coil on said pendulum at a plurality of discrete, spaced-apart points to permit limited flexing of said torque coil relative to said pendulum for accommodating thermal expansion differences between said torque coil or torque coils and pendulum.

11. An accelerometer according to claim 10 wherein said spaced-apart points consist of three such points equally spaced about the torque coil or torque coils.

12. An accelerometer according to claim 1 wherein said means for supporting said pendulum includes a stationary support member separate from said base and means for connecting said support member to said base such that the support member remains substantially stationary relative to said base.

13. An accelerometer according to claim 12 wherein said means for connecting said support member to said base includes a pair of spaced-apart flat leaf springs such that one end of each leaf spring is connected with said base and its opposite end is connected with said support member, each of said leaf springs being disposed in a plane normal to said resting plane and normal to said fixed axis.

14. An accelerometer according to claim 13 wherein one of said leaf springs is configured to isolate the support member from differences in thermal expansion between the support member and base while the other of said leaf springs is sufficiently stiff to prevent low frequency vibrations parallel to said axis from occurring in said support member.

15. An accelerometer according to claim 1 wherein said servo arrangement includes a torque coil or torque coils and means for supporting said torque coil or coils on said pendulum at a plurality of discrete, spaced-apart points only to permit limited flexing of said torque coil or torque coils relative to said pendulum for accommodating thermal expansion differences between said torque coil and pendulum.

16. An accelerometer according to claim 15 wherein said spaced-apart points consist of three such points equally spaced about the torque coil or torque coils.

17. An accelerometer comprising: a main support base; a pendulum assembly including a pendulum and means supporting said pendulum for limited oscillatory movement through a normal resting plane about a fixed axis within said plane and relative to said base in response to and as a result of the pendulum being subjected to acceleration forces normal to said plane; and a servo arrangement cooperating with said pendulum for monitoring the presence and magnitude of said acceleration forces, if present; said means for supporting said pendulum for limited rotational movement including a stationary support member separate form said base and means for connecting said support member to said base such that the support member remains substantially stationary relative to said base, said means for connecting said support member to said base including a pair of spaced-apart flat leaf springs such that the one end of each leaf spring is connected with said base and its opposite end is connected with said support member, each of said leaf springs being disposed in a plane normal to said resting plane and normal to said fixed axis, one of said leaf springs being configured to isolate the support member from differences in thermal expansion between the support member and base while the other of said leaf springs is sufficiently stiff to prevent low frequency vibrations parallel to said axis from occurring in said support member

* * * * *